(12) United States Patent
Bowser (10) Patent No.: US 8,134,951 B2
(45) Date of Patent: Mar. 13, 2012

(54) FRAMEWORK FOR MANAGING NETWORK DATA PROCESSING ELEMENTS

(75) Inventor: Robert Bowser, Copley, OH (US)

(73) Assignee: Cisco Technology, Inc., San Jose, CA (US)

( * ) Notice: Subject to any disclaimer, the term of this patent is extended or adjusted under 35 U.S.C. 154(b) by 927 days.

(21) Appl. No.: 11/757,761

(22) Filed: Jun. 4, 2007

(65) Prior Publication Data

US 2008/0298286 A1 Dec. 4, 2008

(51) Int. Cl.
*H04B 7/00* (2006.01)

(52) U.S. Cl. ............... 370/328; 370/310; 379/15.01; 455/428

(58) Field of Classification Search ........... 370/310, 370/328; 379/15.01; 455/849
See application file for complete search history.

(56) References Cited

U.S. PATENT DOCUMENTS

| | | | | |
|---|---|---|---|---|
| 6,424,652 B1 * | 7/2002 | Christie | | 370/397 |
| 6,704,866 B1 | 3/2004 | Benayoun et al. | | |
| 7,016,379 B2 * | 3/2006 | Falkenstein et al. | | 370/535 |
| 7,403,606 B1 * | 7/2008 | Vasarainen | | 379/229 |
| 2006/0047784 A1 * | 3/2006 | Li et al. | | 709/220 |
| 2006/0106941 A1 | 5/2006 | Singhal et al. | | |
| 2006/0123226 A1 | 6/2006 | Kumar et al. | | |
| 2006/0123425 A1 | 6/2006 | Ramarao et al. | | |
| 2006/0123467 A1 | 6/2006 | Kumar et al. | | |
| 2006/0123477 A1 * | 6/2006 | Raghavan et al. | | 726/22 |
| 2006/0288404 A1 | 12/2006 | Kirshnan et al. | | |
| 2007/0011332 A1 * | 1/2007 | Raghavan et al. | | 709/226 |

OTHER PUBLICATIONS

Cisco Systems, Introducing Cisco Application-Oriented Networking—A CIO Brief, Dec. 31, 2005.
Cisco Systems, Cisco AON Programming Guide, AON Release 2.4, Mar. 2007.

* cited by examiner

*Primary Examiner* — Jinsong Hu
*Assistant Examiner* — Qun Shen
(74) *Attorney, Agent, or Firm* — Tucker Ellis & West LLP (57) ABSTRACT

In one embodiment an apparatus comprises a transceiver in data communication with an associated network and control logic coupled to the transceiver. The control logic is operable to send data to the associated network and receive data from the associated network via the transceiver. The control logic is configured to determine a network element for processing a data stream. The control logic is configured to acquire the network element from the associated network responsive to determining the network element for processing the data stream.

15 Claims, 5 Drawing Sheets

FRAMEWORK FOR MANAGING NETWORK DATA PROCESSING ELEMENTS

TECHNICAL FIELD

The present disclosure relates generally to data stream processing.

BACKGROUND

In a networking environment, an application executing on one node may need to communicate with an application executing on a second node on the network. The first and second nodes can be considered as endpoints for the communication. For example the first node may acquire data from the second node to perform a transaction, or the first node may send data to the second node to post a transaction. To complicate matters, the first node and second node may use different message formats or application layer protocols.

Usually it is not practical or even possible to design or update an application so that the application can converse with other applications using all possible message formats and application layer protocols. Some message formats and application layer protocols may be proprietary and not publicly disclosed. Some message formats and application layer protocols may be relatively new and obscure. Some message formats and application layer protocols may be so old that they are generally considered obsolete. Moreover, some common protocols may not be optimized for message transport.

One or more network data processing elements ("network elements") can be employed to facilitate communications between the endpoints. For example a network element coupled to the first node can convert data for communicating with the second node. Similarly, a network element can be coupled to the second node to facilitate communication with the first node. Additional network elements can be employed to perform common utility functions between the endpoints, such as message routing, logging and event capture. For example, network elements can correspond to bladelets and adapters described in Cisco's Application Oriented Network Systems (AONS), available from Cisco Systems, Inc., 170 West Tasman Drive, San Jose, Calif.; where bladelets are functional blocks that are applied to packet streams and adapters are protocol adapters for ingress and egress traffic streams at the ends of the network.

OVERVIEW OF EXAMPLE EMBODIMENTS

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an example embodiment, there is described herein an apparatus comprising a transceiver in data communication with an associated network and control logic coupled to the transceiver. The control logic is operable to send data to the associated network and receive data from the associated network via the transceiver. The control logic is configured to determine a network element for processing a data stream. The control logic is configured to acquire the network element from the associated network responsive to determining the data stream is to be processed by the network element.

In an example embodiment, there is described herein an apparatus comprising a wireless transceiver, a network transceiver coupled to an associated network and control logic coupled to the wireless transceiver and the network transceiver. Control logic is operable to send and receive data via the wireless transceiver and to send and receive data via the network transceiver. The control logic is configured to acquire a network element for processing the data stream from the associated network via the network transceiver. The control logic is configured to send the network element to the mobile node via the wireless transceiver.

In accordance with an example embodiment, there is described herein a method comprising determining a network element for processing a data stream. The method further comprises requesting the network element from a node coupled to an associated network and receiving the network element.

BRIEF DESCRIPTION OF THE DRAWINGS

The accompanying drawings incorporated in and forming a part of the specification, illustrates examples of the present invention, and together with the description serve to explain the principles of the invention.

DESCRIPTION OF EXAMPLE EMBODIMENTS

This description provides examples not intended to limit the scope of the invention, as claimed. The figures generally indicate the features of the examples, where it is understood and appreciated that like reference numerals are used to refer to like elements.

Described herein is an extensible framework that allows network traffic processing behavior to be distributed to the endpoints of a wireless network. In an example embodiment, the AONS concept is extended to the wireless client, as opposed to stopping at the edge of the infrastructure. For example, two or more endpoints of a wireless link can participate by transforming and reverse transforming network traffic packets. In an example embodiment, one endpoint is a wireless mobile node (or client) and the other endpoint is either a wireless LAN access point for Autonomous wireless networks, a wireless LAN controller for Unified wireless networks, or a node on the network.

This framework will enable the wireless network to process packets to apply compression/decompression, encryption/de-encryption, content manipulation, content translation, content filtering and content logging. Although this framework is equally applicable for both autonomous and unified wireless networks, for particular unified wireless network embodiments processing elements are applied independent of the data plane tunnel (e.g. Lightweight Access Point Protocol "LWAPP" encapsulation).

An example embodiment includes the following architectural components:

1. Definition of processing (network) elements. This describes payload data manipulation using an established and agreed language.

2. Distribution of processing elements to network endpoints in band control plane channel to distribute, activate, deactivate, apply, replace and remove elements.

3. Establishment of rules on endpoints for when to apply processing elements. One embodiment of this system includes manipulating packets at the Internet Protocol (IP) payload layer. Each packet is inspected to determine if it fits a pre-defined criterion for processing. If the packet matches the criterion, the packet contents are processed by the processing element. In an example embodiment, this processing occurs in both directions and includes both transform and inverse transform operations.

In an example embodiment, the definitions of data processing behaviors are grouped by elements. Traffic processing elements are a collection of processing instructions that are applied to a data packet that allow the data packet to be transformed and inversely transformed at the ends of a wireless link or by any two or more endpoints. These processing elements can be applied to any traffic streams that have been designated and allow custom behavior of the network endpoints. These traffic processing elements are applied to data packets being sent over the wireless link and can be created during development time or while deployed and extended by the user. The processing element contains description of packet that it should trigger on, defines upstream behavior, defines downstream behavior, defines other actions to take when detection of trigger occurs.

Behaviors are described by a collection of operations to be applied to either a single or collection of packets (e.g. IP packets). Operations may consist of, but are not limited to, lookup functions, arithmetic and logical operations. Furthermore the operations are described using an accepted and pre-established collection of operations and operands. Operands may include a single octet of a packet, or a range of octets in the packet and groups of octets spanning multiple packets.

Processing elements are stored on WLAN Controller (or other server) and can be deployed in a controlled fashion based on rules, or can be globally deployed. After the processing elements are deployed they can be controlled from the WLAN controller (or other management server). This ongoing control of processing elements includes, but is not limited to, enable/disable on a global level or enable/disable on a per element basis.

In an example embodiment, transforming elements can be selectively applied.

Network traffic consisting of packets may be inspected to determine if they qualify for a particular processing element. Attributes of the packet may be used to make this designation and this includes (but is not limited to) layer 2 through 7 protocol fields.

An example of implementation details for a wireless client (may include but not limited to)

Implementation of the processing elements at the sockets layer;

Implemented on mobile node at the Network Driver Interface Specification (NDIS) layer;

Included as part of CCX (Cisco Compatible Extensions available from Cisco Systems, Inc., 170 W. Tasman Drive, San Jose, Calif.) to establish standard method of defining custom data processing.

In an example embodiment, a wireless endpoint associates with a network, and a controller disposed on the network supplies a list of available elements. The wireless endpoint decides which elements to use and sends a request to the controller for the elements. The controller sends elements to the wireless endpoint. The wireless endpoint receives the element(s) and plugs them into the data stream (similar to Windows Driver Model "WDM" filter driver approach). The wireless endpoint inspects a data stream to determine if it needs to operate on the data, and operates on the data stream at driver layer where appropriate.

In an example embodiment, a particular user application repeatedly requests data from a server that contains numerous repeating sections of data. Network bandwidth would be preserved by applying a dictionary based loss-less compression scheme. Processing elements can be defined in this scenario to implement the compression and de-compression scheme to be applied to each endpoint.

In an example embodiment, a proprietary legacy system of distributed computing with endpoints that rely on data presented in two byte, seven bit ASCII format are connected to an IP based network. The upstream and downstream endpoints in this system sources and sinks information in a bandwidth inefficient ASCII format. Thus, when this system is used in conjunction with a wireless network that is bandwidth constrained, the opportunity for improved bandwidth utilization exists. In this embodiment a transform is defined to convert the two byte ASCII data to a single byte of data using trivial arithmetic or lookup operations. These transforms can be distributed and applied to the data stream. This enables the data moving between the endpoints to be transformed to 50% of its original size while sent over a bandwidth limited interface.

Figure 1:
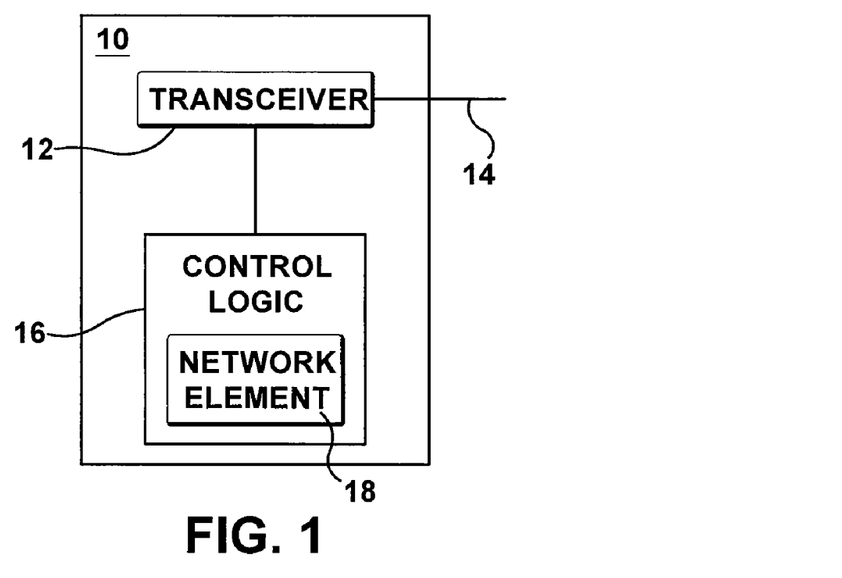
FIG. 1 illustrates an example network node configured to employ a network element for processing a data stream.

FIG. 1 illustrates an example device 10 suitably adapted for operating as a network node and configured to employ a network element for processing a data stream. Network node 10 comprises a transceiver 12 coupled to (e.g. in data communication with) a network via a port 14. Transceiver 12 can be either a wired (e.g. Ethernet) or wireless (e.g. Radio Frequency "RF", Infrared "IR", optical or any suitable wireless communications) transceiver. Similarly, port 14 can be either a wired or wireless port. Transceiver 12 communicates with an associated network (not shown) through port 14.

Control logic 16 is coupled to transceiver 12 and is operable to control the operation of transceiver 12. In an example embodiment, control logic is to send data to the associated network and receive data from the associated network via transceiver 14. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

In an example embodiment, control logic 16 is configured to determine a network element 18 for processing a data stream in communication with transceiver 12. If network element 18 is not installed or coupled to control logic 18, control logic 18 acquires the network element from the associated network. Control logic 18 can acquire network element 18 by sending a signal via transceiver 12 to the associated network requesting the network element. As network element 18 is received on port 14 by transceiver 12, control logic 16 installs network element 18. Once installed, network element 18 can be enabled or disabled to service the data stream.

For example, device 10 can be operating on a wireless network that has one set of access points configured to employ a desired encryption and/or compression technique and another set of access points that are unable to communicate using the desired encryption and/or compression technique. Device 10 can employ network element 18 to perform the desired encryption and/or compression when appropriate. For example, when device 10 is coupled to an access point configured to employ the desired encryption and/or encryption, network element can be enabled. If device 10 roams to an access point that is incapable of using the desired encryption and/or compression technique, network element 18 can be disabled.

In an example embodiment, control logic 16 is configured to send a list of installed network elements to a node on the associated network via transceiver 12. Control logic 16 may send the list upon connecting to the associated network, or may send the list responsive to a request received from the associated network on port 14.

In an example embodiment, control logic 16 is configured to selectively apply network element 18 to the data stream based on the type of packet. For example, network element 18 may apply data compression to an FTP packet, for a hypertext transfer protocol (HTTP) packet network element 18 may employ a coprocessor to transform the packet, for an email packet network element 18 may transform the packet into a format compatible with the email application.

In particular embodiments, several network elements can be employed to process several corresponding data streams. For example, control logic 16 can be configured to dynamically determine a second data stream in communication with transceiver 12 to be processed. Control logic 16 is responsive to determining a second data stream to be processed to determine whether a second network element (not shown) should be used for processing the data stream. If a second network element should be used, control logic 16 is responsive to acquire the second network element from the associated network from port 14 via transceiver 12.

In an example embodiment, network element may comprise a module for performing one or more functions on a data stream. The function can be selected from a group consisting of an encryption, decryption, compression, decompression, content manipulation, content translation, filtering, logging and routing module. For example network element 18 at one endpoint can encrypt, compress, a data stream. A network element at another node (not shown) may log and route the stream. Another endpoint can be responsive to receiving the routed data stream to decrypt and decompress the data stream. In addition, other data modules may be employed for manipulating the data stream (e.g. performing lookups, mathematical or logical operations on the data stream).

Figure 2:
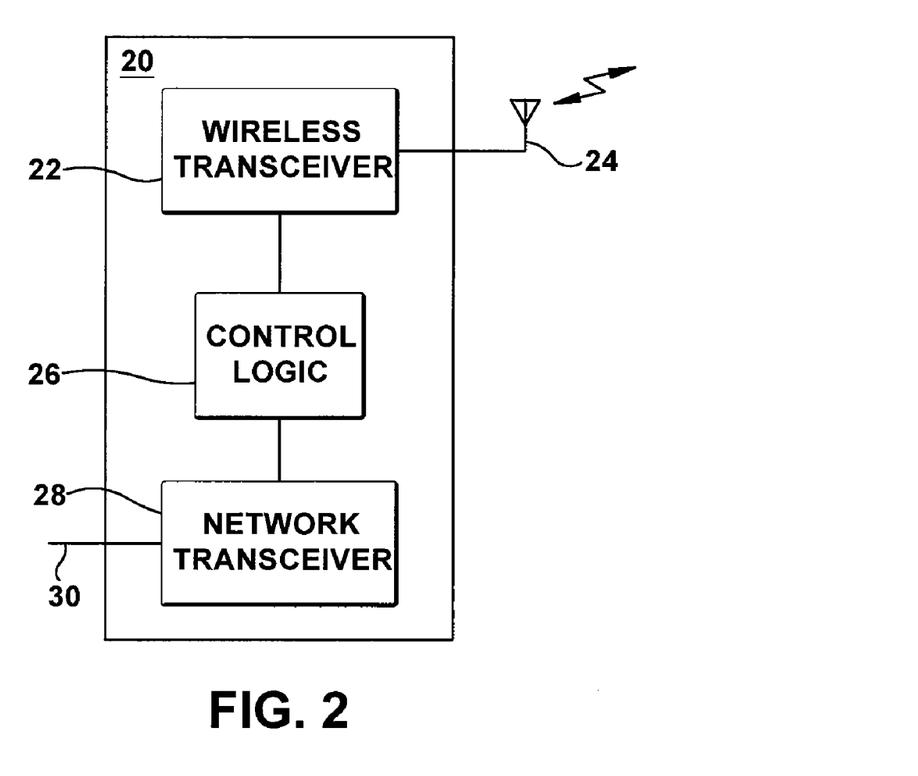
FIG. 2 illustrates an example of an access point.

FIG. 2 illustrates an example of an access point 20. Access point 20 comprises a wireless transceiver 22. Wireless transceiver may use an antenna 24 for wireless communication. Access point 20 also has a network transceiver 28 coupled to an associated network via port 30. Network transceiver 28 may be suitably adapted to connect to any desired wireless (e.g. Mesh) or wired (e.g. Ethernet) network.

Control logic 26 is coupled to wireless transceiver 22 and network transceiver 28. Control logic 26 is operable to control the operation of wireless transceiver 22 and network transceiver 28. In an example embodiment, control logic 26 is operable to send and receive data via wireless transceiver 22 and to send and receive data via network transceiver 28. Control logic 26 is configured to acquire a network element for the mobile node responsive to determining the mobile node is in data communication with a data stream associated with a network element. Control logic 26 is responsive to acquiring the network element to send the network element to the mobile node via wireless transceiver 22. In an example embodiment, control logic 26 stores network elements locally and provides the network elements to mobile nodes associated with wireless transceiver 22.

In an example embodiment, a request for the network element is received from a mobile node via wireless transceiver 22. Control logic 26 is responsive to the request from the mobile node to retrieve the network element. The network element may be stored locally at access point 20 or control logic 26 may obtain the network element from the network via port 30.

In an example embodiment, control logic 26 is configured to determine the network element based on a data stream communicated with the mobile node. For example, control logic 26 can maintain a table associating data streams with mobile nodes. The table may also suitably comprise a list of network elements for servicing data streams. Thus, when a mobile node associates with access point 20 on its wireless port via wireless transceiver 22, control logic 26 determines what data streams to provide to the mobile node and whether to provide the mobile node with a network element for servicing the data streams. For example, control logic 26 can send a signal to the mobile node requesting a list of currently installed network elements. This would enable control logic 26 to determine whether the mobile node has the appropriate network elements installed. If not, then control logic 26 sends (e.g. downloads) appropriate network elements to the mobile node via wireless transceiver 22.

In an example embodiment, control logic 26 is configured to send a signal via wireless transceiver 22 to the mobile node to enable a network element. Control logic 26 may also be configured to send a signal via wireless transceiver 22 to the mobile node to disable the network element.

In an example embodiment, control logic 26 further comprises an inverse network element. The inverse network element is operable to process a data stream received by wireless transceiver 22 that was processed by the network element. For example, if a data stream received by wireless transceiver 22 was encrypted by a network element, the inverse network element can be employed to decrypt the data stream. Control logic 26 is responsive to processing the received data stream to forward the data stream onto the associated network via network transceiver 22.

In an example embodiment, control logic 26 is operable to transform a data stream before sending the data stream on its wireless port. The data stream is received from network transceiver 28. Control logic 26 employing a network element transforms the data stream. Control logic 26 forwards the transformed data stream to the mobile node via wireless transceiver. 22

Figure 3:
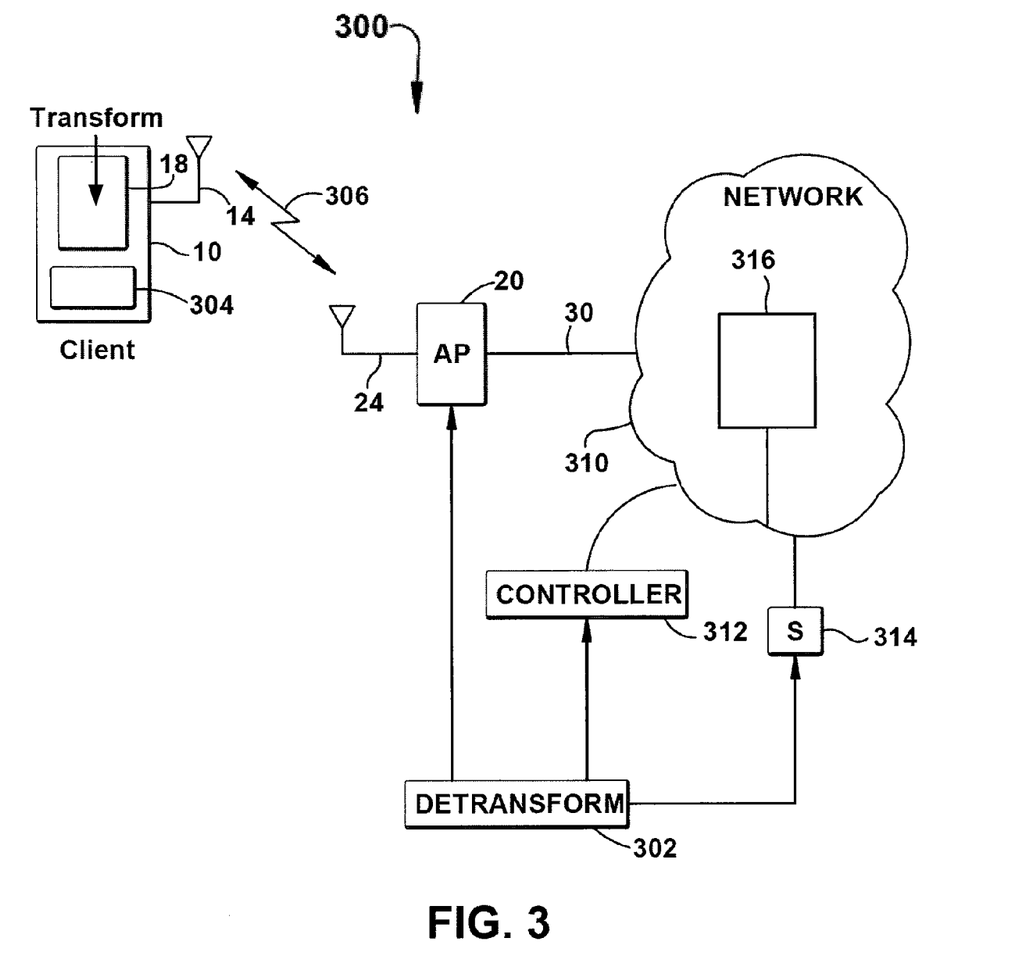
FIG. 3 illustrates an example Wireless Local Area Network (WLAN).

FIG. 3 illustrates an example Wireless Local Area Network (WLAN) 300. A distribution network 310 is coupled to an access point (AP) 20 on port 30. An AP controller 312 is also coupled to distribution network 310. Distribution network 310 is also coupled to a server 314 and a node 316. Node 316 can be an infrastructure node such as an Ethernet station, switch, router or any type of computing device. In particular embodiments, node 316 comprises logic adapted for implementing Cisco's AONS.

A mobile node 10 is in bidirectional data communication with AP 20 as indicated by arrow 306. Mobile node 10 comprises a client 304. A network element 18 for performing a transform function is operable to operate on a data stream being sent by mobile node 10. In an example embodiment, network element 18 is provided to mobile node 10 by AP 20. Network element 18 can be coupled to client 304 via a Cisco Compatible Extension (CCX).

In an example embodiment, mobile node 10 transforms a data stream before sending it to AP 20 using network element 18. For example, in a WLAN it is often desirable to save bandwidth by compressing data, thus in an example embodiment network element 18 compresses the data before sending the data to AP 20. An inverse network element 302 performs a de-transformation of the transformed data.

Inverse network element 302 can be located at any desired location. For example, inverse network element 302 can be located at AP 20, at controller 312, server 314 or on node 316. For example, compressed data send along bi-directional link 306 can be decompressed by AP 20, by controller 312, server 314 or node 316. For example, if the data stream is to be routed on a foreign network, the compressed data stream received by AP 20 can be forwarded to node 316 (a router in this example) via distribution network 310. Node 316 can decompress the data and encapsulate the data before routing the data (e.g. perform an IP routing of the data). As another example, the data stream can be directed to server 314 for processing, the data can be sent compressed and encrypted by mobile node 10 to AP 20 which forwards the data on distribution network 310 to server 314. Server 314 would then decrypt and decompress the data.

Figure 4:
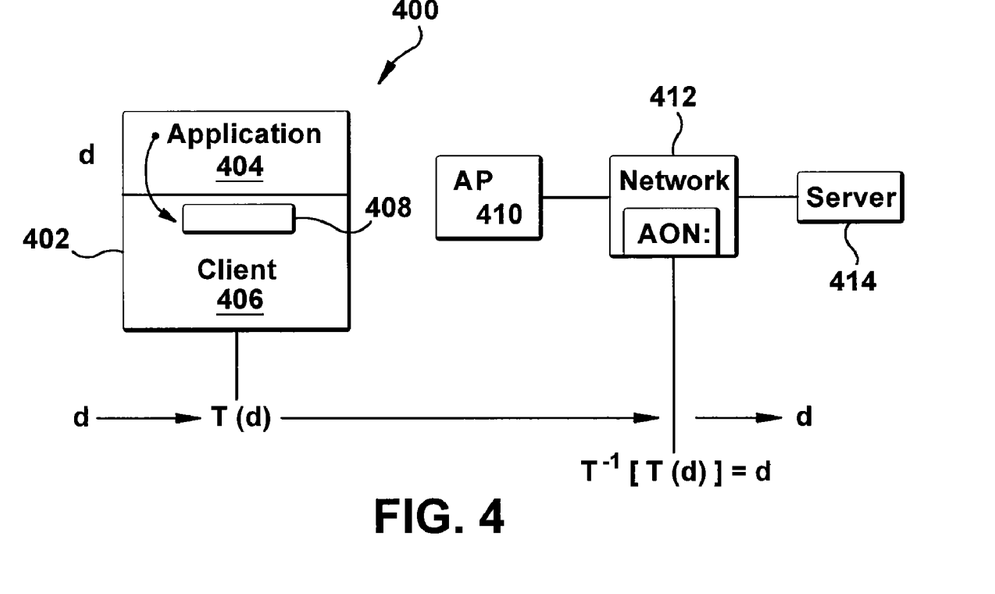
FIG. 4 illustrates an example of a data stream routed through a WLAN.

FIG. 4 illustrates an example of a data stream routed through a WLAN 400.

In this example embodiment, a mobile node 402 comprises an application 404, client 406 and network element 408. Data (d) is generated by application 404 and forwarded to client network element which processes (transforms) the data, resulting in transformed data represented by T(d).

The transformed data T(d) is sent to the distribution network 412 through AP 410. Distribution network 412 employs an Application-Oriented-Networking Systems (AONS) module 412 that extracts the data by performing a de-transformation (or inverse transformation) on the transformed data, e.g. $T^{-1}[T(d)]=d$. The data is then forwarded via network 412 to server 414. Although this example embodiment illustrates data sent from the mobile node 402 to server 414, those skilled in the art can readily appreciate that by employing the appropriate network elements, data sent from server 414 can be transformed by network 412 and sent to mobile node 402 and mobile node 402 can perform an inverse transform function to acquire the data.

Figure 5:
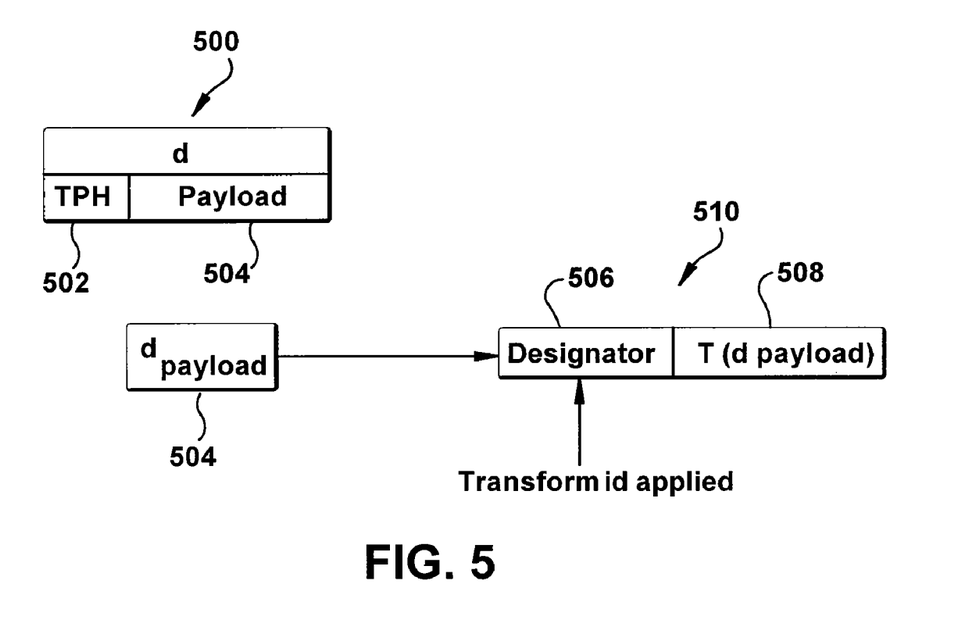
FIG. 5 illustrates an example of transformation of a data packet.

FIG. 5 illustrates an example of transformation of a data packet 500. Data packet 500 comprises a header 502 and payload 504. In an example embodiment, header 502 comprises data indicative of a destination, such as routing data and/or data indicative of the type of data contained in payload 504. Payload 504 is transformed, producing a transformed payload 510 that comprises a designator 506 and transformed payload T(payload) 508. Designator 506 is applied in order to indicate that payload 504 was transformed into transformed payload 508. In an example embodiment, header 502 is appended (or pre-appended) to transformed payload 510 and forwarded. In another example embodiment, header 502 and transformed payload 510 are encapsulated and forwarded (e.g. an IP encapsulation can be performed, wherein an IP header is added and the data is routed to the destination using IP routing.

Figure 6:
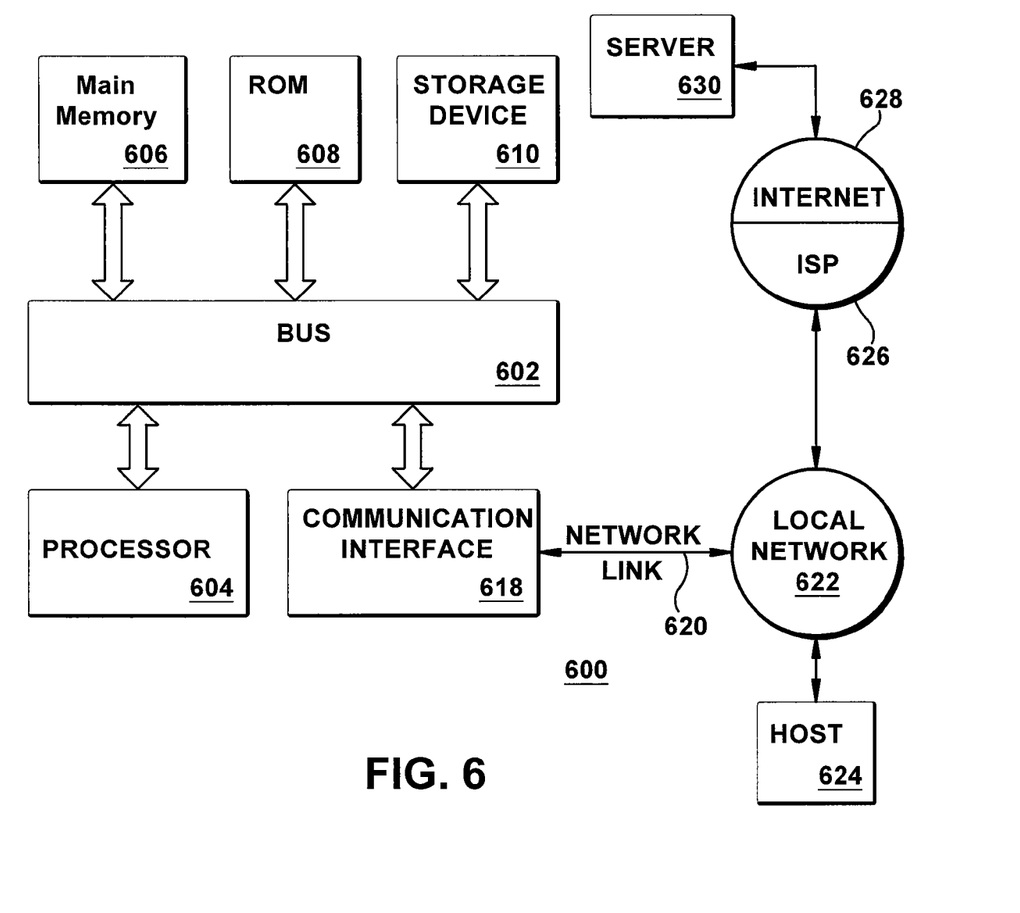
FIG. 6 illustrates an example of a computer system for implementing an example embodiment.

FIG. 6 illustrates an example of a computer system 600 for implementing an example embodiment. Computer system 600 is suitably adapted for implementing control logic 16 (FIG. 1) and/or control logic 22 (FIG. 2).

Computer system 600 includes a bus 602 or other communication mechanism for communicating information and a processor 604 coupled with bus 602 for processing information. Computer system 600 also includes a main memory 606, such as random access memory (RAM) or other dynamic storage device coupled to bus 602 for storing information and instructions to be executed by processor 604. Main memory 606 also may be used for storing a temporary variable or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

In an example embodiment, computer system 600 can be implemented for managing network data processing elements. According to an example embodiment, managing network data processing elements is provided by computer system 600 in response to processor 604 executing one or more sequences of one or more instructions contained in main memory 606. Such instructions may be read into main memory 606 from another computer-readable medium, such as storage device 610. Execution of the sequence of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to non-volatile media, volatile media, and transmission media. Non-volatile media include for example optical or magnetic disks, such as storage device 610. Volatile media include dynamic memory such as main memory 606. Transmission media include coaxial cables, copper wire and fiber optics, including the wires that comprise bus 602. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD, any other memory chip or cartridge, a carrier wave as described hereinafter, or any other medium from which a computer can read.

Various forms of computer-readable media may be involved in carrying one or more sequences of one or more instructions to processor 604 for execution. For example, the instructions may initially be borne on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606 from which processor 604 retrieves and executes the instructions.

The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communications through the world-wide packet data communication network, now commonly referred to as the "Internet" 628. Local networks 622 and Internet 628 both use electrical, electromagnetic, or optical signals that carry the digital data to and from computer system 600.

Computer system 600 can send messages and receive data, including program codes, through the network(s), network link 620, and communication interface 618. In the Internet example, a server 630 might transmit a requested code for an application program through Internet 628, ISP 626, local network 622, and communication interface 618. In accordance with an example embodiment, one such downloaded application provides for managing network data processing elements as described herein.

The received code may be executed by processor 604 as it is received, and/or stored in storage device 610, or other non-volatile storage for later execution. In this manner, computer system 600 may obtain application code in the form of a carrier wave.

Figure 7:
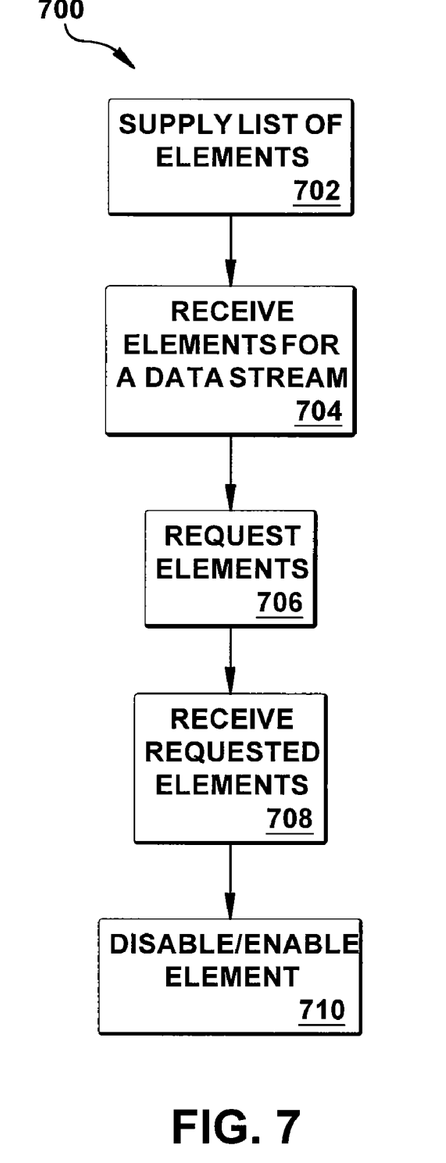
FIG. 7 illustrates an example methodology manage a network element for a node coupled to a network.
Figure 8:
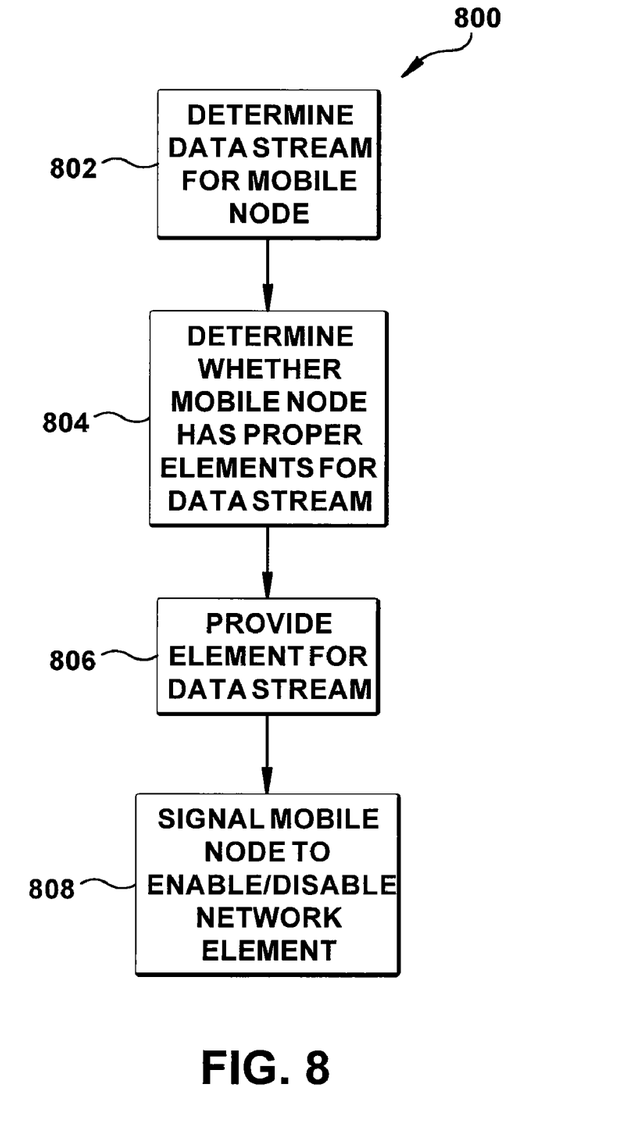
FIG. 8 illustrates an example methodology for a network access point to manage a network element for a mobile node.

In view of the foregoing structural and functional features described above, methodologies in accordance with various example embodiments will be better appreciated with reference to FIGS. 7 and 8. While, for purposes of simplicity of explanation, the methodologies of FIGS. 7 and 8 are shown and described as executing serially, it is to be understood and appreciated that the methodologies is not limited by the illustrated order, as some aspects could, in accordance with the methodologies, occur in different orders and/or concurrently with other aspects from that shown and described herein. Moreover, not all illustrated features may be required to implement a methodology. Embodiments of the present invention are suitably adapted to implement the methodology in hardware, software, or a combination thereof.

FIG. 7 illustrates an example methodology 700 to manage a network element for a node coupled to a network. In an example embodiment, methodology 700 is executed by a node upon connecting with a network. For example, a mobile node may implement methodology 700 responsive to associating with an access point.

At 702, a list of network elements is provided. For example, when a mobile node associates with an access point, the mobile node can provide a list of currently installed network elements to the access point. This enables the network infrastructure to determine whether the mobile node has a network element for a data stream. Optionally, this can enable the network infrastructure to remove or update obsolete network elements. The list can be provided automatically, or can be provided when requested by the infrastructure. For example, for a wired node a weekly inventory can be implemented to verify the node has up to date processing elements.

At 704, networking elements for processing a data stream are determined. In an example embodiment, the determination is made by an endpoint of the data stream (e.g. a wireless mobile node or a node on a distribution network). In another example embodiment, a node coupled to an endpoint can make the determination. For example an access point upon receiving a request from a mobile node to receive a data stream can determine whether the mobile node has the appropriate network elements for the data stream. As another example, an endpoint on the network (e.g. a server or an AONS node) processing a request for a data stream may determine whether the requesting node (e.g. another node on the network such as a wireless mobile node) has the appropriate network element.

At 706, a request for one or more network elements for the data stream is made. The request may be generated by an endpoint (e.g. a wireless mobile node) or a node servicing the endpoint (e.g. an AP). In an example embodiment the request to send network elements to the endpoint can be made by another endpoint (e.g. a server that is sending and/or receiving the data stream or an AONS node on the network).

At 708, one or more network elements for processing the data stream is received by the endpoint. For example, a wireless mobile node may receive the network elements wirelessly from its AP. Once the network elements have been received, they can be installed and the endpoint can process the data stream.

At 710, the network elements can be enabled or disabled as desired. For example, the network elements can be employed to administer and configure 802.11 compatible protocol behaviors between a client (e.g. in a client in a wireless mobile node) and AP (or controller depending on the network architecture). For example, network elements can be used to configure and administer the behavior of a data stream by detecting a particular type of traffic (based on any one or range of network layers) and vary the bit rate (e.g. higher or lower), power level, or use a different network identifier. In an example embodiment, network elements can be used to extend AONS capabilities to wireless controllers where layer 2 forwarding occurs at the controller and not the AP.

FIG. 8 illustrates an example methodology 800 for a network access point (or in a LWAPP (Lightweight Access Point Protocol) environment a wireless controller or another infrastructure node in data communication with the AP) to manage a network element for a mobile node. Although the steps of methodology 800 are described as being performed by an AP, this is for ease of illustration and it should not be construed that these steps can only be performed by an AP as those skilled in the art should readily appreciate that any one or more of these steps can be performed by a wireless controller or any other infrastructure node in data communication with the AP.

At 802, a data stream for the mobile node is determined. The mobile node may request a data stream, or the mobile node may already be subscribing to a data stream (e.g. when a mobile node subscribing to a data stream roaming to a new AP). In an example embodiment, a table accessible to the AP can track the data streams for an endpoint, e.g. an authentication/authorization server or similar entity may maintain a table listing authorized data streams for the endpoint.

At 804, it is determined whether the mobile node has the appropriate network element (or elements) for the data stream. In an example embodiment, the mobile node provides a list of installed network elements. In another example embodiment, the AP can acquire the data from the network infrastructure. In yet another example embodiment, the AP can request the mobile node send a list of network elements.

At 806, the AP provides the mobile node with a network element for the data stream. The network element can be an element the mobile node does not have installed or an upgraded element. The AP can acquire the element from anywhere on the network (e.g. from a server, an AONS node) or the AP can maintain network elements locally at the AP.

At 808, the AP can signal the mobile node to enable or disable the network element. For example, the mobile node may roam to a foreign network or to an AP that is unable to process the transformed data stream. The mobile node can be signaled to stop processing the data stream with the network element (or alternatively to process the data stream with another network element). In an example embodiment, all endpoints can be signaled to enable or disable processing the data stream with the network element. For example, a mobile IP phone (e.g. a VoIP phone) can be configured to encrypt and decrypt voice packets when the IP phone is removed from its handset. When the phone is replaced into the handset, encryption and decryption of the voice packets can be disabled.

What has been described above includes example implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
   a transceiver in data communication with an associated network, and
   control logic coupled to the transceiver and operable to send data to and receive data from the associated network via the transceiver;
   wherein the control logic is configured to associate the apparatus with an endpoint disposed on the associated network;
   wherein the control logic is configured to send a list of installed network elements to a node on the associated network via the transceiver;
   wherein the control logic is configured to determine whether a predefined network element to employ for processing a first data stream associated with endpoint is installed on the apparatus in response to associating therewith;
   wherein the control logic is configured to receiving the determined predefined network element from the associated network via the transceiver responsive to determining the predefined network element is not installed;
   wherein the control logic is configured to install the received predefined network element responsive to the receipt thereof;
   wherein the control logic is responsive to employing the predefined network element for processing the data stream;
   wherein the control logic is configured to dynamically determine a second data stream to be processed;
   wherein the control logic is responsive to determining the second data stream to be processed to determine a second network element for processing the second data stream; and
   wherein the control logic is responsive for determining the second network element to acquire the second network element from the associated network.

2. The apparatus according to claim 1, wherein the control logic is further configured to disable the predefined network element responsive to a signal received by the transceiver to disable the network element.

3. The apparatus according to claim 1, wherein the control logic is further configured to enable the predefined network element responsive to a signal received by the transceiver to enable the network element.

4. The apparatus according to claim 1, wherein the transceiver is a wireless transceiver.

5. The apparatus according to claim 1, wherein the control logic is further configured to acquire the predefined network element by sending a request to the node on the associated network via the transceiver; and
   the control logic is configured to receive the predefined network element via the transceiver.

6. The apparatus according to claim 1, the control logic is configured to selectively apply the predefined network element to the data stream based on the type of packet.

7. The apparatus according to claim 1, wherein the predefined network element is selected from a group consisting of an encryption module, a decryption module, a compression module, a decompression module, a content manipulation module, a content translation module, a filtering module, a logging module and a routing module.

8. An apparatus, comprising:
   a wireless transceiver;
   a network transceiver coupled to an associated network; and
   control logic coupled to the wireless transceiver and the network transceiver, the control logic is operable to send and receive data via the wireless transceiver and to send and receive data via the network transceiver;
   wherein the control logic is operable to associate with a mobile node via the wireless transceiver;
   wherein the control logic is operable to associate a first data stream with the mobile node and an endpoint disposed on a wireless network in data communication with the network transceiver;
   wherein the control logic is configured to signal the mobile node for a list of installed network elements upon association with the data stream;
   wherein the control logic is configured to receive data from the mobile node responsive to the signal, the data including a list of network elements installed at the mobile node;
   wherein the control logic is configured to determine whether a predefined network element for processing the data stream is installed on the mobile node in accordance with the list of installed network elements;
   wherein the control logic is configured to acquire the predefined network element from the associated network via the network transceiver responsive to determining the predefined network element is not installed on the mobile node; and
   wherein the control logic is configured to send the predefined network element to the mobile node via the wireless transceiver responsive to acquiring the network element;

wherein the control logic is configured to dynamically determine a second data stream to be processed;

wherein the control logic is responsive to determining the second data stream to be processed to determine a second network element for processing the second data stream; and wherein the control logic is responsive for determining the second network element to send the second network element to the mobile node via the wireless transceiver.

9. The apparatus according to claim 8, wherein the control logic is further configured to send a signal via the wireless transceiver to the mobile node to disable the predefined network element.

10. The apparatus according to claim 8, wherein the control logic is further configured to send a signal via the wireless transceiver to the mobile node to enable the predefined network element.

11. The apparatus according to claim 8, the control logic further comprising:

an inverse network element, the inverse network element is operable to process a data stream received by the wireless transceiver that was processed by the network element; and wherein the control logic is responsive to processing the received data stream with the inverse network element to forward the data stream onto the associated network via the network transceiver.

12. The apparatus according to claim 8, wherein the control logic is further configured to transform a data stream received from the network transceiver; and wherein the control logic is configured to forward the transformed data stream to the mobile node via the wireless transceiver.

13. A method, comprising:

associating with a wireless mobile node via a wireless transceiver;

associating a first data stream with the wireless mobile node and an endpoint disposed on an associated network;

requesting the wireless mobile node send a list of installed network elements upon associating the first data stream with the wireless mobile node;

receiving from an endpoint a list of network elements installed on the endpoint upon association thereof with an associated network;

determining whether a predefined network element for processing a data stream between the endpoint and at least one additional endpoint is installed on the endpoint from the list of network elements;

acquiring the predefined network element from the at least one additional endpoint responsive to determining that the network element is not installed on the endpoint;

transmitting the predefined network element from the at least one additional endpoint to the endpoint;

dynamically determining a second data stream to be processed;

determining a second network element for processing the second data stream responsive to determining the second data stream to be processed to; and transmitting the second network element to the mobile node to the endpoint responsive for determining the second network element.

14. The method according to claim 13 further comprising enabling the network element while the predefined data stream is processed by the network element.

15. The method according to claim 14 further comprising disabling the predefined network element, responsive to processing of the data stream ceasing.

* * * * *